United States Patent [19]  
Denzel et al.

[11] 3,894,021  
[45] July 8, 1975

[54] DERIVATIVES OF 1,7-DIHYDRO-2H-PYRAZOLO[4',3':5,6]PYRIDO[4,3-D]PYRIMIDINE-2,4-(3H)-DIONES

[75] Inventors: Theodor Denzel, Nurnberg; Hans Hoehn, Tegernheim, both of Germany

[73] Assignee: E. R. Squibb & Sons, Inc., Princeton, N.J.

[22] Filed: Jan. 28, 1974

[21] Appl. No.: 437,461

[52] U.S. Cl. .......................... 260/256.4 F; 424/251
[51] Int. Cl. ............................................. C07d 51/42
[58] Field of Search .............................. 260/256.4 F Primary Examiner—Donald G. Daus  
Assistant Examiner—James H. Turnipseed  
Attorney, Agent, or Firm—Lawrence S. Levinson; Merle J. Smith

[57] ABSTRACT

The new derivatives of 1,7-Dihydro-2H-pyrazolo[4',3':5,6]pyrido[4,3-d]pyrimidine-2,4-(3H)-diones have the general formula

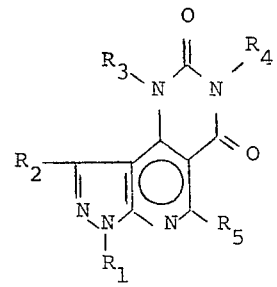

$R_1$ is hydrogen, lower alkyl, phenyl or phenyl-lower alkyl.

$R_2$ is hydrogen, lower alkyl or phenyl.

$R_3$ is hydrogen, lower alkyl, phenyl, phenyl-lower alkyl, (lower alkyl)amino-lower alkyl or di(lower alkyl)amino-lower alkyl.

$R_4$ is lower alkyl, phenyl, lower alkyl-phenyl or cyclo lower alkyl.

$R_5$ is hydrogen or lower alkyl.

They are useful as anti-inflammatory agents and central nervous system depressants. In addition, this type of compound increases the intracellular concentration of adenosine-3',5-cyclic monophosphate.

13 Claims, No Drawings

DERIVATIVES OF 1,7-DIHYDRO-2H-PYRAZOLO[4',3':5,6]PYRIDO[4,3-D]PYRIMIDINE-2,4-(3H)-DIONES

SUMMARY OF THE INVENTION

This invention relates to new derivatives of 1,7-dihydro-2H-pyrazolo[4',3':5,6]pyrido[4,3-d]pyrimidine-2,4-(3H)-diones. These new compounds have the general formula (I)

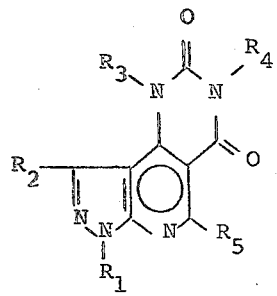

The symbols have the following meanings in formula I and throughout this specification.

$R_1$ is hydrogen, lower alkyl, phenyl or phenyl lower alkyl.

$R_2$ is hydrogen, lower alkyl or phenyl.

$R_3$ is hydrogen, lower alkyl, phenyl, phenyl lower alkyl, (lower alkyl)amino-lower alkyl or di(lower alkyl)amino-lower alkyl.

$R_4$ is lower alkyl, phenyl, lower alkyl-phenyl or cyclo lower alkyl.

$R_5$ is hydrogen or lower alkyl.

The lower alkyl groups are straight or branched chain hydrocarbon radicals of up to seven carbons like methyl, ethyl, propyl, isopropyl, butyl, isobutyl, t-butyl and the like. The one to four carbon alkyl groups are preferred, especially the one and two carbon members. The cyclo-lower alkyl groups are the three to six carbon alicyclics cyclopropyl, cyclobutyl, cyclopentyl and cyclohexyl, preferably the last two.

Preferred compounds of formula I are those in which $R_1$ is hydrogen or lower alkyl, especially ethyl; $R_2$ and $R_5$ is hydrogen or methyl, especially hydrogen; $R_3$ is lower alkyl or di(lower alkyl)amino-lower alkyl, especially dimethylaminopropyl, $R_4$ is lower alkyl, especially methyl, phenyl or cyclohexyl.

DETAILED DESCRIPTION

The new compounds of formula I are produced from compounds of the formula (II)

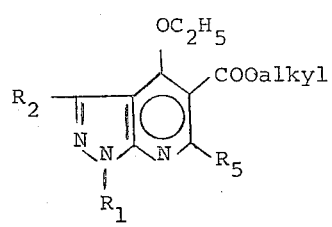

(U.S. Pat. No. 3,773,777, Nov. 20, 1973). The compound of formula II is treated with ammonia at about 120°C. for 10 hours in an autoclave, producing a compound of the formula (III)

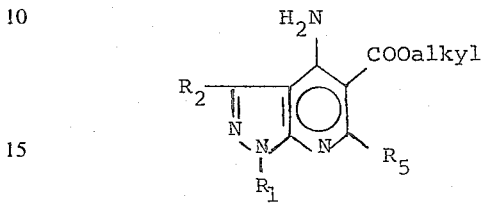

Compounds of formula I wherein $R_3$ is hydrogen, i.e., (Ia)

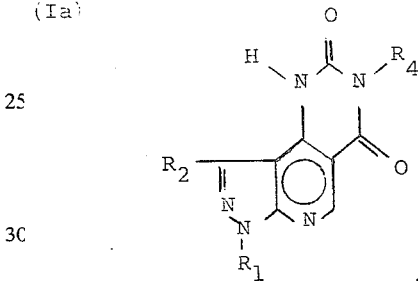

are obtained by reaction of a compound of formula III with an isocyanate of the formula (IV)

$$R_4-N=C=O$$

in the presence of a strong base such as sodium hydride or the like. Compounds of formula I, wherein $R_3$ is other than hydrogen are produced by reacting a compound of formula Ia with an appropriate alkyl halide or substituted alkyl halide in the presence of sodium hydride.

When $R_1$ is hydrogen the modification wherein $R_1$ is a heteromethylene group is used as described in the above cited U.S. Pat. No. 3,773,777.

The intermediates are processed as described therein to obtain a compound of the formula (V)

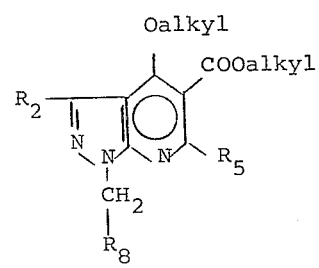

wherein $R_8$ is a heterocyclic like furyl, pyridyl, pyrimidyl, pyrazinyl or the like. This compound of formula V is processed in the same manner as the product of formula III, e.g., by treatment with ammonia, reaction with an isocyanate of formula IV and alkylation with the appropriate alkyl halide. At this point a compound of the formula (Ib)

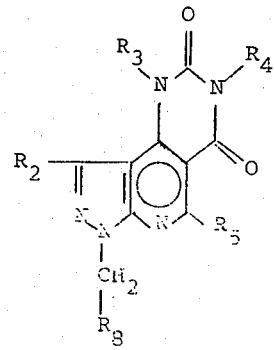

is obtained and this is now oxidized with an oxidizing agent like selenium dioxide in a high boiling solvent like dimethyleneglycol dimethylether at about 160°C. to produce a product of formula I wherein $R_1$ is hydrogen.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I is administered orally or parenterally in a conventional dosage form such as tablet, capsule, injectable or the like. A single dose, or preferably 2 to 4 divided daily doses, provided on a basis of about 3 to 50 mg. per kilogram per day, preferably about 3 to 15 mg. per kilogram per day, is appropriate. These may be conventionally formulated in an oral or parenteral dosage form by compounding about 10 to 250 mg. per unit of dosage with conventional vehicle, excipient, binder, perservative, stabilizer, flavor or the like as called for by accepted pharmaceutical practice.

The new compounds also increase the intracellular concentration of adenosine-3',5'-cyclic monophosphate, and thus, by the administration of about 1 to 100 mg./kg./day, preferably about 10 to 50 mg./kg., in single or two to four divided doses in conventional oral or parenteral dosage forms such as those described above they may be used to alleviate the symptoms of asthma.

The new compounds of this invention, in addition, have antiinflammatory properties and are useful, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance can be utilized in compositions such as tablets, capsules, solutions or suspensions containing up to about 300 mg. per unit of dosage of a compound or mixture of compounds of formula I. They are compounded in conventional manner with a physiologically acceptable vehicle or carrier, excipient, binder, preservative, stabilizer, flavor, etc. as called for by accepted pharmaceutical practice. Topical preparations containing about 0.03 to 3 percent by weight of active substance in a lotion, salve or cream may also be used.

The following examples are illustrative of the invention. All temperatures are on the centigrade scale.

EXAMPLE 1 a. 4-Amino-1-ethyl-1H-pyrazolo[3,4-b]pyridine-5-carboxylic acid ethyl ester 10.4 g. of 4 ethoxy-1-ethyl-1H-pyrazolo[3,4-b]pyridine-5-carboxylic acid ethyl ester (0.04 mol.) and 50 ml. of an alcoholic solution of ammonia (56.5 g. ammonia in 1000 ml. ethanol) are heated in an autoclave at 65° for 15 hours. After cooling, the solid 4-amino-1-ethyl-1H-pyrazolo[3,4-b]pyridine-5-carboxylic acid ethyl ester is filtered off and recrystallized from ethanol, yield, 7.4 g. (90%), m.p. 181°–182°.

b. 7-Ethyl-1,7-dihydro-3-methyl-2H-pyrazolo[4',3':5,6]pyrido-[4,3-d]pyrimidine-2,4-(3H)-dione 234 g. of 4 amino-1-ethyl-1H-pyrazolo[3,4-b]pyridine-5-carboxylic acid ethyl ester (1 mol.) are slowly added to a suspension of 24.4 g. of sodium hydride in anhydrous dioxane at reflux temperature. After the addition is completed, the mixture is stirred for one hour. 57 g. of methyl isocyanate are slowly added dropwise so that the mixture gently refluxes. Heating is continued for 5 hours. After cooling, the product is acidified by adding glacial acetic acid and the precipitated 7-ethyl-1,7-dihydro-3-methyl-2H-pyrazolo[4',3':5,6]pyrido[4,3-d]-pyrimidine-2,4-(3H)-dione is filtered off and recrystallized from dimethylformamide, yield, 211 g. (86%); m.p. 331°–332°.

EXAMPLE 2

1-[3-(Dimethylamino)propyl]-7-ethyl-1,7-dihydro-3-methyl-2H-pyrazolo[4',3':5,6]pyrido[4,3-d]pyrimidine-2,4-(3H)-dione 4.9 g. of 7 Ethyl-1,7-dihydro-3-methyl-2H-pyrazolo[4',3':5,6]pyrido[4,3-d]pyrimidine-2,4-(3H)-dione (0.02 mol.) are dissolved in 50 ml. of anhydrous dimethylformamide. 0.55 g. of sodium hydride are added and the mixture is heated at 60° for 2 hours. After this time 2.5 g. of 3-(dimethylamino)propyl chloride are added with stirring. The temperature is maintained for 10 hours. The solvent is distilled off and the residual 1-[3-(dimethylamino)propyl]-7-ethyl-1,7-dihydro-3-methyl-2H-pyrazolo[4',3':5,6]pyrido[4,3-d]pyrimidine-2,4-(3H)-dione is recrystallized from ethyl acetate, yield, 5.5 g. (90%); m.p. 77°–78°.

EXAMPLE 3

7-Ethyl-1,7-dihydro-3-phenyl-2H-pyrazolo[4',3':5,6]pyrido[4,3-d]-pyrimidine-2,4-(3H)-dione 23.4 g. of 4-amino-1-ethyl-1H-pyrazolo[3,4-b]pyridine-5-carboxylic acid ethyl ester (0.1 mol.) are slowly added to 2.6 g. of sodium hydride in 150 ml. of anhydrous dioxane. The mixture is refluxed with stirring for about 1 hour. At this time, 12 g. of phenyl isocyanate are added dropwise and the mixture heated at reflux temperature for 10 additional hours. The solution is acidified with acetic acid and the precipitated 7-ethyl-1,7-dihydro-3-phenyl-2H-pyrazolo[4',3':5,6]pyrido-[4,3-d]pyrimidine-2,4-(3H)-dione is filtered and recrystallized from dimethylformamide, yield, 21.8 g. (71%), m.p. > 350°.

EXAMPLE 4

1,7-Diethyl-1,7-dihydro-3-phenyl-2H-pyrazolo[4',3':5,6]pyrido-[4,3-d]pyrimidine-2,4-(3H)-dione 3.1 g. of 7-ethyl-1,7-dihydro-3-phenyl-2H-pyrazolo-[4',3':5,6]pyrido[4,3-d]pyrimidine-2,4-(3H)-dione. (0.01 mol.) and 0.3 g. of sodium hydride in 50 ml. of anhydrous dioxane are heated with stirring at about 70° for 1 hour. After this time, 2 g. of ethyl iodide are added dropwise and stirring at this temperature is continued for 10 hours. The mixture is evaporated to dryness and the residual 1,7-diethyl-1,7-dihydro-3-phenyl-2H-pyrazolo[4',3':5,6]pyrido[4,3-d]pyrimidine-2,4-(3H)-dione is recrystallized from ethyl acetate, yield, 2.1 g. (63%), m.p. 231°-232°.

EXAMPLE 5

3-Cyclohexyl-7-ethyl-1,7-dihydro-2H-pyrazolo[4',3':5,6]pyrido[4,3-d]pyrimidine-2,4-(3H)-dione By substituting an equivalent amount of cyclohexyl isocyanate in the procedure of Example 3, 3-cyclohexyl-7-ethyl-1,7-dihydro-2H-pyrazolo[4',3':5,6]pyrido[4,3-d]pyrimidine-2,4-(3H)-dione is obtained, m.p. 304°-305°.

EXAMPLE 6

3-Cyclohexyl-1,7-diethyl-1,7-dihydro-2H-pyrazolo[4',3':5,6]-pyrido[4,3-d]pyrimidine-2,4-(3H)-dione By treatment of 3-cyclohexyl-7-ethyl-1,7-dihydro-2H-pyrazolo[4',3':5,6]pyrido[4,3-d]pyrimidine-2,4-(3H)-dione with ethyl iodide according to the procedure of Example 4, 3-cyclohexyl-1,7-diethyl-1,7-dihydro-2H-pyrazolo[40',3':5,6]-pyrido[4,3-d]pyrimidine-2,4-(3H)-dione, m.p. 169°-170°, is obtained.

EXAMPLE 7

7-Ethyl-1,7-dihydro-3-methyl-1-(3-methylbutyl)-2H-pyrazolo [4',3':5,6]pyrido[4,3-d]pyrimidine-2,4-(3H)-dione By treating the product of Example 1 b with isopentyl iodide as in Example 4, 7-ethyl-1,7-dihydro-3-methyl-1-(3-methylbutyl)-2H-pyrazolo[4',3':5,6]pyrido[4,3-d]pyrimidine-2,4-(3H)-dione, m.p. 141°-143°, is obtained.

EXAMPLE 8

1,7-Diethyl-1,7-dihydroy-3-methyl-2H-pyrazolo[4',3':5,6]pyrido-[4,3-d]pyrimidine-2,4-(3H)-dione By substituting the product of Example 1 b for the starting material in the procedure of Example 4, 1,7-diethyl-1,7-dihydro-3-methyl-2H-pyrazolo[4',3':5,6]pyrido[4,3-d]-pyrimidine-2,4-(3H)-dione, m.p. 167°-168°, is obtained.

EXAMPLE 9

3-Cyclobutyl-1,7-dihydro-2H-pyrazolo[4',3':5,6]pyrido[4,3-d]-pyrimidine-2,4-(3H)-dione By substituting 4-amino-1H-pyrazolo[3,4-b]pyridine-5-carboxylic acid ethyl ester for the 4-amino-1-ethyl-1H-pyrazolo 3,4-b]pyridine-5-carboxylic acid ethyl ester and cyclobutyl isocyanate for the phenyl isocyanate in the procedure of Example 3, 3-cyclobutyl-1,7-dihydro-2H-pyrazolo[4',3':5,6]-pyrido[4,3-d]pyrimidine-2,4-(3H)-dione is obtained.

EXAMPLE 10

1-Benzyl-3-cyclobutyl-1,7-dihydro-2H-pyrazolo[4',3':5,6]pyrido[4,3-d]pyrimidine-2,4(3H)-dione By treating the product of Example 9 with benzyl chloride instead of ethyl iodide according to the procedure of Example 4, 1-benzyl-3-cyclobutyl-1,7-dihydro-2H-pyrazolo-[4',3':5,6]pyrido[4,3-d]pyrimidine-2,4(3H)-dione is obtained.

EXAMPLE 11

3-Butyl-7-phenyl-1,7-dihydro-2H-pyrazolo[40',3':5,6]pyrido-[4,3-d]pyrimidine-2,4(3H)-dione By treating 4-amino-1-phenyl-1H-pyrazolo[3,4-b]-pyridine-5-carboxylic acid ethyl ester with butyl isocyanate as in Example 1b, 3-butyl-7-phenyl-1,7-dihydro-2H-pyrazolo[4',3':5,6]-pyrido[4,3-d]pyrimidine-2,4-(3H)-dione is obtained.

EXAMPLE 12

1-[2-(2-Diethylamino)ethyl]-3-butyl-7-phenyl-1,7-dihydro-2H-pyrazolo[4',3':5,6]pyrido[4,3-d]pyrimidine-2,4(3H)-dione By treating the product of Example 11 with diethylaminoethyl chloride as in Example 2, 1-[2-(2-diethylamino)ethyl]-3-butyl-7-phenyl-1,7-dihydro-2H-pyrazolo[4',3':5,6]pyrido [4,3-d]pyrimidine-2,4(3H)-dione is obtained.

EXAMPLE 13

3-Butyl-1,7-diphenyl-1,7-dihydro-2H-pyrazolo[4',3':5,6]pyrido-[4,3-d]pyrimidine-2,4(3H)-dione By treating the product of Example 11 with iodobenzene as in Example 4, 3-butyl-1,7-diphenyl-1,7-dihydro-2H-pyrazolo[4',3':5,6]pyrido[4,3-d]pyrimidine-2,4(3)-dione is obtained.

EXAMPLE 14

5,9-Diethyl-1,7-dihydro-3-phenyl-2H-pyrazolo[4',3':5,6]pyrido-[4,3-d]pyrimidine-2,4(3H)-dione is obtained.

By treating 4-amino-3,6-diethyl-1H-pyrazolo[3,4-b]-pyridine-5-carboxylic acid ethyl ester with phenyl isocyanate as in Example 3, 5,9-diethyl-1,7-dihydro-3-phenyl-2H-pyrazolo[4',3':5,6]pyrido[4,3-d]-pyrimidine-2,4(3H)-dione is obtained.

EXAMPLE 15

5,9-Diethyl-1,7-dihydro-1-methyl-3-phenyl-2H-pyrazolo[4',3':5,6]-pyrido[4,3-d]pyridimidine-2,4(3H)-dione By treating the product of Example 14 with methyl iodide by the procedure of Example 4, 5,9-diethyl-1,7-dihydro-1-methyl-3-phenyl-2H-pyrazolo[4',3':5,6]pyrido[4,3-d]-pyrimidine-2,4(3H)-dione is obtained.

EXAMPLE 16

3-p-Tolyl-1,7-dihydro-2H-pyrazolo[4',3':5,6]pyrido[4,3-d]-pyrimidine-2,4(3H)-dione By substituting 4-amino-1H-pyrazolo[3,4-b]pyridine-5-carboxylic acid methyl ester for the 4-amino-1-ethyl-1H-pyrazolo-[3,4-b]pyridine-5-carboxylic acid ethyl ester and benzyl isocyanate for the p-tolyl isocyanate in the procedure of Example 3, 3-p-tolyl-1,7-dihydro-2H-pyrazolo[4',3':5,6]pyrido[4,3-d]pyrimidine-2,4(3H)-dione is obtained.

EXAMPLE 17

1-[2-(Methylamino)ethyl-7-ethyl-1,7-dihydro-3-methyl-2H-pyrazolo-[4',3':5,6]pyrido[4,3-d]pyrimidine-2,4(3H)-dione By substituting (2-methylamino)ethyl chloride for the 3-(dimethylamino)propyl chloride in the procedure of Example 2,1-[2-(methylamino)ethyl]-7-ethyl-1,7-dihydro-3-methyl-2H-pyrazolo[4',3':5,6]pyrido[4,3-d]pyrimidine-2,4(3H)-dione is obtained.

EXAMPLE 18

3,5,9-Triphenyl-1,7-dihydro-2H-pyrazolo[4',3':5,6]pyrido[4,3-d]pyrimidine-2,4(3H)-dione By treating 4-amino-3,6-diphenyl-1H-pyrazolo-[3,4-b]pyridine-5-carboxylic acid ethyl ester with phenyl isocyanate as in Example 3,3,5,9-triphenyl-1,7-dihydro-2H-pyrazolo-[4',3':5,6]pyrido[4,3-d]pyrimidine-2,4(3H)-dione is obtained.

EXAMPLE 19

5,9-Dimethyl-1,7-dihydro-7-ethyl-3-phenyl-2H-pyrazolo[4',3':5,6]-pyrido[4,3-d]pyrimidine-2,4(3H)-dione By treating 4-amino-1-ethyl-3,6-dimethyl-1H-pyrazolo[3,4-b]pyridine-5-carboxylic acid methyl ester with phenyl isocyanate as in Example 3, 5,9-dimethyl-1,7-dihydro-7-ethyl-3-phenyl-2H-pyrazolo[4',3':5,6]pyrido[4,3-d]pyrimidine-2,4(3H)-dione is obtained.

What is claimed is:

1. A compound of the formula

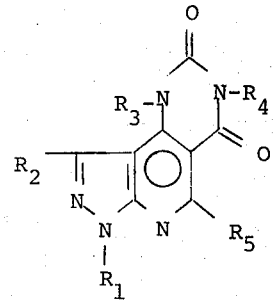

wherein $R_1$ is hydrogen, lower alkyl, phenyl or phenyl-lower alkyl; $R_2$ is hydrogen, lower alkyl or phenyl; $R_3$ is hydrogen, lower alkyl, phenyl, phenyl-lower alkyl, (lower alkyl) amino-lower alkyl or di(lower alkyl)amino -lower alkyl; $R_4$ is lower alkyl, phenyl, (lower alkyl)-phenyl or three to six carbon cyclo-lower alkyl; and $R_5$ is hydrogen or lower alkyl, said lower alkyl groups having up to seven carbons.

2. A compound as in claim 1 wherein $R_1$ is hydrogen or lower alkyl; $R_2$ and $R_5$ is hydrogen or methyl; $R_3$ is lower alkyl or di(lower)amino-lower alkyl; $R_4$ is lower alkyl, phenyl or cycloalkyl.

3. A compound as in claim 1 wherein $R_1$ and $R_4$ each is lower alkyl, $R_2$, $R_3$ and $R_5$ each is hydrogen.

4. The compound as in claim 1 wherein $R_1$ is ethyl, $R_2$, $R_3$ and $R_5$ each is hydrogen and $R_4$ is methyl.

5. A compound as in claim 1 wherein $R_1$, $R_3$ and $R_4$ each is lower alkyl and $R_2$ and $R_5$ each is hydrogen.

6. The compound as in claim 1 wherein $R_1$ is ethyl, $R_2$ and $R_5$ each is hydrogen, $R_3$ is isopentyl and $R_4$ is methyl.

7. The compound as in claim 1 wherein $R_1$ and $R_3$ each is ethyl, $R_2$ and $R_5$ each is hydrogen and $R_4$ is methyl.

8. A compound as in claim 1 wherein $R_1$ and $R_4$ each is lower alkyl, $R_2$ and $R_5$ each is hydrogen and $R_3$ is di(-lower alkyl)amino-lower alkyl.

9. The compound as in claim 1 wherein $R_1$ is ethyl, $R_2$ and $R_5$ each is hydrogen, $R_3$ is dimethylaminopropyl and $R_4$ is methyl.

10. A compound as in claim 1 wherein $R_1$ and $R_3$ each is lower alkyl, $R_2$ and $R_5$ each is hydrogen and $R_4$ is phenyl.

11. The compound as in claim 10 wherein each lower alkyl group is ethyl.

12. A compound as in claim 1 wherein $R_1$ is lower alkyl, $R_2$, $R_3$ and $R_5$ each is hydrogen and $R_4$ is phenyl.

13. The compound as in claim 12 wherein the lower alkyl group is ethyl.

* * * * *